US010492357B2

(12) United States Patent
Conrad et al.

(10) Patent No.: US 10,492,357 B2
(45) Date of Patent: Dec. 3, 2019

(54) ELECTRONICALLY PULSING AGRICULTURAL PRODUCT WITH SEED UTILIZING SEED TRANSPORT MECHANISM

(71) Applicant: AMVAC CHEMICAL CORPORATION, Newport Beach, CA (US)

(72) Inventors: Larry M. Conrad, Walker, IA (US); Richard L. Rice, Collierville, TN (US); Rex A. Rysdam, Bloomfield, IA (US); Richard M. Porter, Ankeny, IA (US)

(73) Assignee: AMVAC CHEMICAL CORPORATION, Newport Beach, CA (US)

( * ) Notice: Subject to any disclaimer, the term of this patent is extended or adjusted under 35 U.S.C. 154(b) by 0 days.

(21) Appl. No.: 16/057,528

(22) Filed: Aug. 7, 2018

(65) Prior Publication Data

US 2018/0359912 A1    Dec. 20, 2018

Related U.S. Application Data

(63) Continuation of application No. 15/208,605, filed on Jul. 13, 2016, now Pat. No. 10,058,023.

(51) Int. Cl.
*A01C 7/10* (2006.01)
*A01C 7/20* (2006.01)
(Continued)

(52) U.S. Cl.
CPC ............... *A01C 7/105* (2013.01); *A01C 7/04* (2013.01); *A01C 7/102* (2013.01); *A01C 7/128* (2013.01); *A01C 7/20* (2013.01); *A01C 7/206* (2013.01)

(58) Field of Classification Search
CPC .......... A01C 7/105; A01C 7/102; A01C 7/10; A01C 7/08; A01C 7/00; A01C 1/06;
(Continued)

(56) References Cited

U.S. PATENT DOCUMENTS

| 113,591 A | 4/1871 | Beainebd |
|---|---|---|
| 317,988 A | 5/1885 | Gibbon |

(Continued)

FOREIGN PATENT DOCUMENTS

| WO | 2011025592 A1 | 3/2011 |
|---|---|---|
| WO | 2013191990 A2 | 12/2013 |

(Continued)

OTHER PUBLICATIONS

Screenshot from http:/www.amvacsmartbox.com/AboutSmartBoxiAboulSmartBoxilabid/I03/Default.aspx ,downloaded on Sep. 23, 2016 (1 Page).

(Continued)

*Primary Examiner* — Christopher J. Novosad
(74) *Attorney, Agent, or Firm* — Lawrence N. Ginsberg

(57) ABSTRACT

A system for electronically pulsing agricultural product with seed. A seed transport mechanism is affixed to a seed planter row unit having a seed metering system, operating at a high speed configured to dispense seed. The seed transport mechanism is configured to provide a seed release speed at which the seed and agricultural product exit the seed transport mechanism, the seed release speed being varied in a manner proportional to the variation in the ground speed of the seed planter row unit to minimize seed tumbling to optimize accurate placement of seed and chemical granule agricultural product at varying ground speeds of the seed planter row unit. In the various embodiments, the agricul- (Continued)

tural product is directed away from moving parts after the seed leaves the seed metering system of the seed planter row unit.

15 Claims, 11 Drawing Sheets

(51) Int. Cl.
*A01C 7/04* (2006.01)
*A01C 7/12* (2006.01)

(58) Field of Classification Search
CPC .... A01C 1/00; A01C 7/04; A01C 7/06; A01C 7/128; A01C 7/127; A01C 7/12; A01C 7/20; A01C 7/206
USPC ......................................................... 111/173
See application file for complete search history.

(56) References Cited

U.S. PATENT DOCUMENTS

| | | |
|---|---|---|
| 469,999 A | 3/1892 | Hoos |
| 600,629 A | 3/1898 | Levi |
| 781,693 A | 2/1905 | Tandy |
| 825,263 A | 7/1906 | Jameson et al. |
| 861,355 A | 7/1907 | Brower |
| 868,300 A | 10/1907 | Sohner et al. |
| 924,099 A | 6/1909 | Nelson |
| 931,882 A | 8/1909 | Martin |
| 2,794,407 A | 6/1957 | Wist et al. |
| 4,009,668 A | 3/1977 | Brass et al. |
| 4,497,265 A | 2/1985 | Hood et al. |
| 4,521,908 A | 6/1985 | Miyaji et al. |
| 4,522,340 A | 6/1985 | Gandrud |
| 4,529,073 A | 7/1985 | Lewis |
| 4,570,858 A | 2/1986 | Binter et al. |
| 4,611,606 A | 9/1986 | Hall et al. |
| 4,691,645 A | 9/1987 | Anderson |
| 4,705,220 A | 11/1987 | Gandrud et al. |
| 4,896,615 A | 1/1990 | Hood, Jr. et al. |
| 4,917,304 A | 4/1990 | Mazzei et al. |
| 4,971,255 A | 11/1990 | Conrad |
| 5,024,173 A | 6/1991 | Deckler |
| 5,029,624 A | 7/1991 | McCunn et al. |
| 5,060,701 A | 10/1991 | McCunn et al. |
| 5,125,438 A | 6/1992 | McCunn et al. |
| 5,220,876 A | 6/1993 | Monson et al. |
| 5,224,577 A | 7/1993 | Falck et al. |
| 5,301,848 A | 4/1994 | Conrad et al. |
| 5,379,812 A | 1/1995 | McCunn et al. |
| 5,524,794 A | 6/1996 | Benedetti, Jr. et al. |
| 5,539,669 A | 7/1996 | Goeckner et al. |
| 5,638,285 A | 6/1997 | Newton |
| 5,641,011 A | 6/1997 | Benedetti, Jr. et al. |
| 5,687,782 A | 11/1997 | Cleveland et al. |
| 5,737,221 A | 4/1998 | Newton |
| 5,931,882 A | 8/1999 | Fick et al. |
| 6,122,581 A | 9/2000 | McQuinn |
| 6,198,986 B1 | 3/2001 | McQuinn |
| 6,216,615 B1 * | 4/2001 | Romans ................... A01C 7/04 111/177 |
| 6,748,884 B1 | 6/2004 | Bettin et al. |
| 6,763,773 B2 | 7/2004 | Schaffert et al. |
| 6,938,564 B2 | 9/2005 | Conrad et al. |
| 7,171,912 B2 | 2/2007 | Fraisse et al. |
| 7,171,913 B1 | 2/2007 | Conrad |
| 7,270,065 B2 | 9/2007 | Conrad |
| 7,311,050 B2 * | 12/2007 | Eastin ...................... A01C 7/06 111/118 |
| 7,317,988 B2 | 1/2008 | Johnson |
| 7,380,733 B2 | 6/2008 | Owenby et al. |
| 7,694,638 B1 | 4/2010 | Riewerts et al. |
| 7,916,022 B2 | 3/2011 | Wilcox et al. |
| 8,024,074 B2 | 9/2011 | Stelford et al. |
| 8,141,504 B2 | 3/2012 | Dean et al. |
| 8,322,293 B2 | 12/2012 | Wollenhaupt et al. |
| 8,336,470 B2 | 12/2012 | Rans |
| 8,371,239 B2 | 2/2013 | Rans et al. |
| 8,371,240 B2 | 2/2013 | Wollenhaupt et al. |
| 8,504,234 B2 | 8/2013 | Anderson |
| 8,504,310 B2 | 8/2013 | Landphair et al. |
| 8,517,230 B2 | 8/2013 | Memory |
| 8,600,629 B2 | 12/2013 | Zielke |
| 8,781,693 B2 | 7/2014 | Woodcock |
| 8,825,263 B1 | 9/2014 | Nelson, Jr. |
| 8,868,300 B2 | 10/2014 | Kocer et al. |
| 8,924,099 B2 | 12/2014 | Nelson, Jr. |
| 9,113,591 B2 | 8/2015 | Shivak |
| 2003/0226484 A1 | 12/2003 | O'neall et al. |
| 2004/0231575 A1 | 11/2004 | Wilkerson et al. |
| 2007/0193483 A1 | 8/2007 | Conrad |
| 2007/0266917 A1 | 11/2007 | Riewerts et al. |
| 2010/0101466 A1 | 4/2010 | Riewerts et al. |
| 2010/0282141 A1 | 11/2010 | Wollenhaupt et al. |
| 2010/0282143 A1 | 11/2010 | Preheim et al. |
| 2010/0282144 A1 | 11/2010 | Rans et al. |
| 2010/0282147 A1 | 11/2010 | Wollenhaupt et al. |
| 2011/0035055 A1 | 2/2011 | Applegate et al. |
| 2011/0054743 A1 | 3/2011 | Kocer et al. |
| 2011/0296750 A1 | 12/2011 | Davis et al. |
| 2012/0010789 A1 | 1/2012 | Dulnigg |
| 2012/0042815 A1 | 2/2012 | Wonderlich |
| 2013/0061789 A1 | 3/2013 | Binsirawanich et al. |
| 2013/0061790 A1 | 3/2013 | Binsirawanich et al. |
| 2013/0085598 A1 | 4/2013 | Kowalchuk |
| 2013/0152835 A1 | 6/2013 | Stevenson et al. |
| 2013/0192503 A1 | 8/2013 | Henry et al. |
| 2014/0026792 A1 | 1/2014 | Bassett |
| 2014/0183182 A1 | 7/2014 | Oh et al. |
| 2014/0252111 A1 | 9/2014 | Michael et al. |
| 2014/0263705 A1 | 9/2014 | Michael et al. |
| 2014/0263708 A1 | 9/2014 | Thompson et al. |
| 2014/0263709 A1 | 9/2014 | Kocer et al. |
| 2014/0277780 A1 | 9/2014 | Jensen et al. |
| 2014/0284400 A1 | 9/2014 | Hebbert et al. |
| 2015/0094916 A1 | 4/2015 | Bauerer et al. |
| 2015/0097707 A1 | 4/2015 | Nelson, Jr. et al. |
| 2015/0195988 A1 | 7/2015 | Radtke et al. |
| 2015/0334912 A1 | 11/2015 | Sauder et al. |
| 2016/0374260 A1 * | 12/2016 | Kowalchuk .............. A01C 1/06 111/170 |
| 2018/0049367 A1 | 2/2018 | Garner et al. |

FOREIGN PATENT DOCUMENTS

| | | |
|---|---|---|
| WO | 2014018717 A1 | 1/2014 |
| WO | 2013191990 A3 | 2/2014 |
| WO | 2015061570 A1 | 4/2015 |

OTHER PUBLICATIONS

Screenshot from http://www.amvacsmartbox.com/Portals/0/Guides/DropTubes/Drop%20Tube%20-%20John%20Deere%20-%20Reart%20Mount.PD, downloaded on Jul. 13, 2017 (1 Page).
European Application No. EP-14 85 5768.9, European Extended Search Report and Written Opinion of the European Searching Authority dated May 10, 2017 Attached to Pursuant to Rule 62 EPC and Cited References (92 Pages).

* cited by examiner

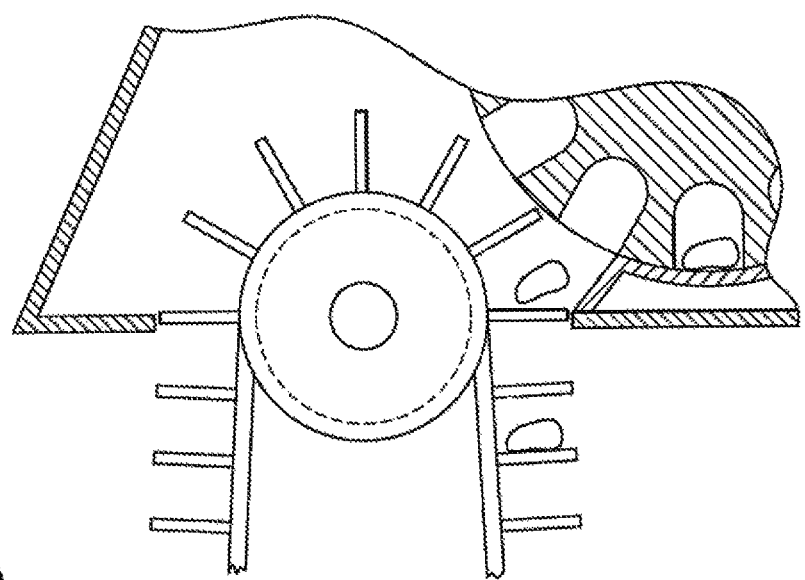
FIG. 7A
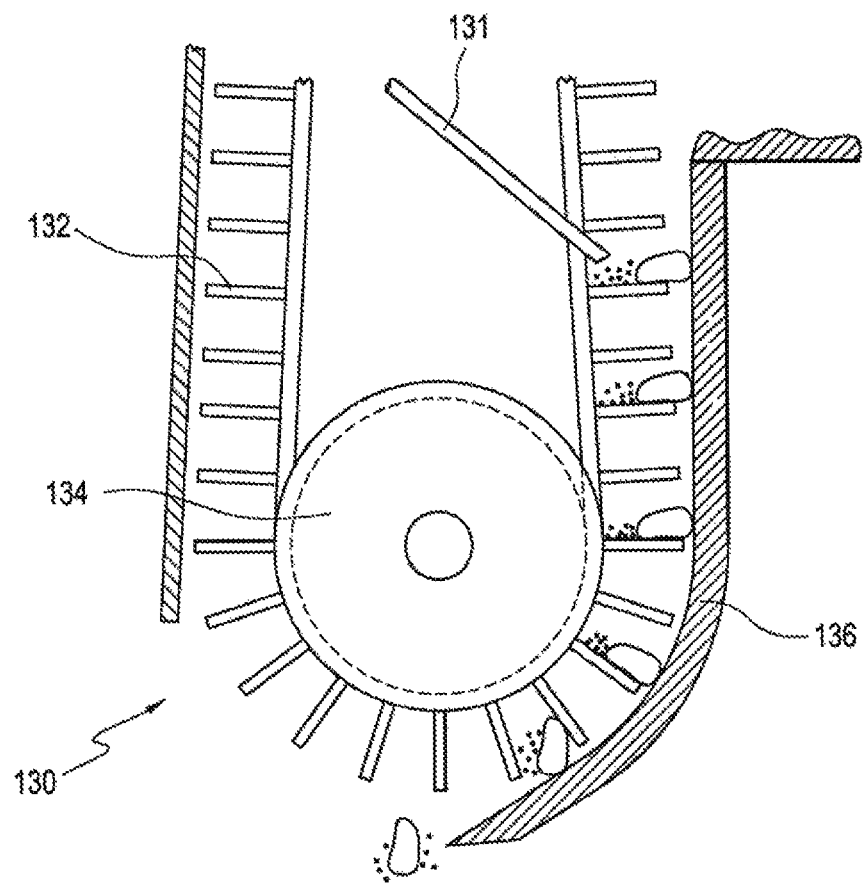

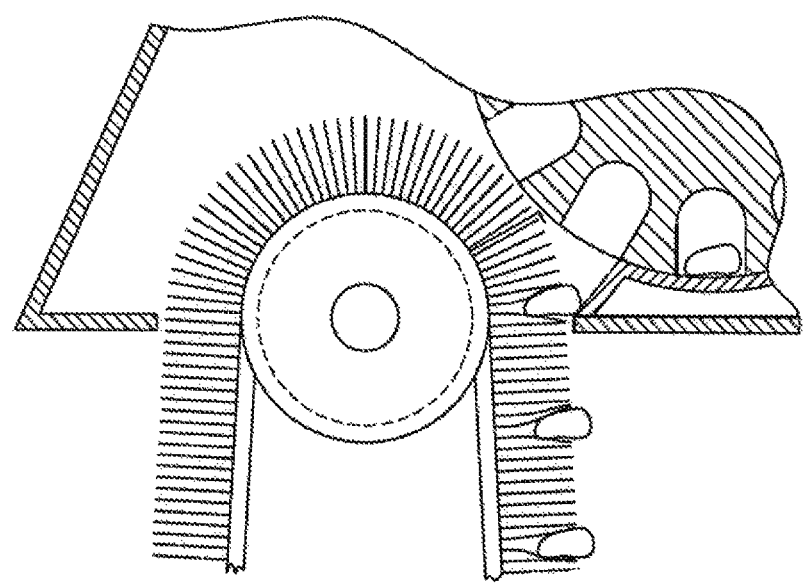
FIG. 7B
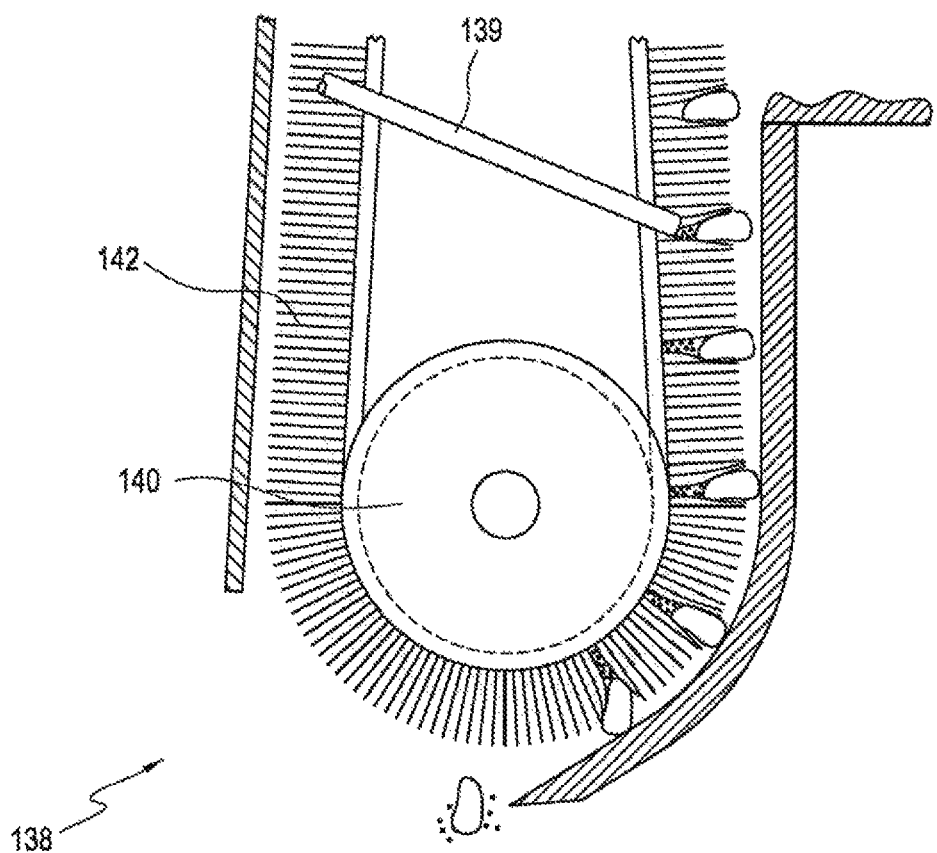

ELECTRONICALLY PULSING AGRICULTURAL PRODUCT WITH SEED UTILIZING SEED TRANSPORT MECHANISM

CROSS REFERENCE TO RELATED APPLICATIONS

This patent application is a continuation application of U.S. application Ser. No. 15/208,605, filed Jul. 13, 2016, entitled ELECTRONICALLY PULSING AGRICULTURAL PRODUCT WITH SEED UTILIZING SEED TRANSPORT MECHANISM.

BACKGROUND OF THE INVENTION

1. Field of the Invention

The present invention relates to dispensing seeds and insecticides and, more particularly, to electronically releasing agricultural product in close proximity to seed by sensing the passage of a seed through a seed transport mechanism and releasing the agricultural product, the placement of the seed and agricultural product being optimized in accordance with varying groundspeeds of the seed planter row unit.

2. Description of the Related Art

In markets requiring the usage of chemicals, often hazardous substances, the Environmental Protection Agency and other regulatory bodies are imposing stricter regulations on the transportation, handling, dispersion, disposal, and reporting of actual usage of chemicals. These regulations, along with public health concerns, have generated a need for products that address these issues dealing with proper chemical handling.

To reduce the quantity of chemicals handled, the concentration of the chemical, as applied, has been increasing. This has raised the cost of chemicals per unit weight and has also required more accurate dispensing systems. For example, typical existing systems for agricultural product dispensing use a mechanical chain driven dispenser. Normal wear and tear on these mechanical dispensers can alter the rate of product applied by as much as 15%. For one typical chemical, Force®, a pyrethroid type insecticide by Syngenta Crop Protection, an over-application rate of 15% can increase the cost of the insecticide by $1500 over 500 acres and may contribute or cause unwanted crop response, such as plant phytotoxicity or unregistered amounts of pesticide residues in or on the crop.

Since many of the current agricultural product systems are mechanical systems, any record keeping and reporting must generally be kept manually.

The foregoing illustrates limitations known to exist in many present material delivery systems. Thus, it is apparent that it would be advantageous to provide an alternative directed to overcoming one or more of the limitations set forth above. Accordingly, a suitable alternative is provided including features more fully disclosed hereinafter.

Over the past decade, planting and chemical dispensing systems for dispensing seed and insecticides, herbicides, fungicides, nutrients, plant growth regulators, or fertilizers, have made the handling of seed and chemical liquids or granules less hazardous to the agricultural worker by providing closed container systems, such as those described in U.S. Pat. Nos. 5,301,848 and 4,971,255, incorporated by reference herein and the SmartBox® System marketed by AMVAC Chemical Corporation, a division of American Vanguard Corporation. Briefly, as described in U.S. Pat. No. 5,301,848, access to and from a container in a closed container system is available through a single opening in the bottom wall of the container, offering distinct advantages over an open-top, non-removable container design in an open container system.

Closed container systems provide a removable container which is pre-filled with the chemical of toxic materials such as insecticides, fertilizers, herbicides and other pesticides or other agricultural products, thereby eliminating the need to open and pour bags of chemical products into storage hoppers. Since the closed container system is largely not open to the air, agricultural workers have less opportunity to come into contact with the chemical products, thereby reducing skin and inhalation exposure to the hazardous chemicals.

Currently, there is an industry program to double corn yields in 20 years through use of new technology. At the present time most products that are applied at planting are for the treatment of nematodes, soil insects, weeds in the seed zone, fungicides and bactericides, corn rootworm, secondary pests, etc. There is research being conducted for other products such as biological products, fertility products, fungicides, micro-nutrients, growth stimulants, the new area of RNA silencing or interference gene technology, etc.

Additionally, a steady decline in the overall honeybee population year to year is a growing problem worldwide. It has been reported that the air vacuum planters exhaust the insecticide dust from the seed treatment and it may be affecting the bee population. This effect on non-target species could be potentially reduced in a closed system.

Research has indicated that it is inefficient to use the conventional method of dispensing chemical granules, in which chemical granules are dispersed over an entire length of the seed furrow in which seed is planted. Instead, dispensing smaller amounts of the chemical granules of insecticides and other pesticides in close proximity to the seed not only obtains the desired effect of eliminating insects or pests, but also reduces the amount of chemical agent that is used to obtain such an effect. As such, the result is more cost effective, environmentally friendly, and less hazardous, while maintaining the desired effect of the chemical granules.

There is a need for a chemical dispensation system that more closely regulates the amount of chemical dispensed with the seed.

There is further a need for a chemical dispensation system that dispenses the chemical in closer proximity with the seed.

There is further a need for the placement of the seed and chemical to be optimized in accordance with varying groundspeeds of the seed planter row unit.

SUMMARY OF THE INVENTION

In a broad aspect, the present invention is embodied as a system for electronically pulsing agricultural product with seed. A seed transport mechanism is affixed to a seed planter row unit having a seed metering system, operating at a high speed configured to dispense seed. The seed transport mechanism includes a conduit for introducing agricultural product with seed. The agricultural product is configured to be introduced with the seed after output from the seed metering system. A seed sensing device is operably connected to the seed transport mechanism and configured to sense a dispensation of the seed from the seed transport mechanism. The agricultural product conduit is configured to dispense agricultural products into the seed transport mechanism to provide dispensing of the agricultural products with the seed as the seed and agricultural product exit the seed transport mechanism. The agricultural products comprise chemical granules. A control interface electronic system is operably connected to an agricultural product metering system and the agricultural product conduit, the control interface electronic system being configured to dispense a particular quantity of agricultural product with the seed in the seed transport mechanism. An electrical pulsing valve is operably coupled to the agricultural product conduit and the control interface electronic system, being configured to open to dispense chemical granule agricultural products from the agricultural product conduit when the seed sensing device senses the dispensation of the seed. The seed transport mechanism is configured to provide a seed release speed at which the seed and agricultural product exit the seed transport mechanism, the seed release speed being varied in a manner proportional to the variation in the ground speed of the seed planter row unit to minimize seed tumbling to optimize accurate placement of seed and chemical granule agricultural product at varying ground speeds of the seed planter row unit. In the various embodiments, the agricultural product is directed away from moving parts after the seed leaves the seed metering system of the seed planter row unit.

In one embodiment the seed transport mechanism and the agricultural product tube are in an integrated assembly for accurate placement of the chemical granules with the seed. In one embodiment the seed transport mechanism comprises a paddle belt assembly. In other embodiments the seed transport mechanism may be a brush belt or disc/seed pocket assembly.

The present invention provides enhanced and more accurate placement of agricultural products with the seed. With new high speed planters, improvements in placement techniques are especially needed. By putting the agricultural product (e.g. chemical) in the seed transport mechanism such an improved placement is provided. The present invention takes advantage of the seed transport mechanism's purpose, which is to accelerate the seed's horizontal speed to the speed needed to prevent seed bounce and provide for accurate placement. In previous seed transport mechanisms, where the agricultural product is placed separately, the agricultural products (i.e. typically granular products) can bounce and scatter at the higher speeds if the placement speeds of those agricultural products are different than the speed of the planter unit. Similarly, when liquid agricultural products are sprayed into the furrow there is a scattering effect from the planter's higher speed, which the present invention minimizes.

BRIEF DESCRIPTION OF THE DRAWINGS

FIG. 7A is a schematic illustration of a seed transport mechanism using a paddle belt assembly.

FIG. 7B is a schematic illustration of a seed transport mechanism using a brush belt assembly.

The same elements or parts throughout the figures of the drawings are designated by the same reference characters, while equivalent elements bear a prime designation.

DETAILED DESCRIPTION OF THE INVENTION

Figure 1:
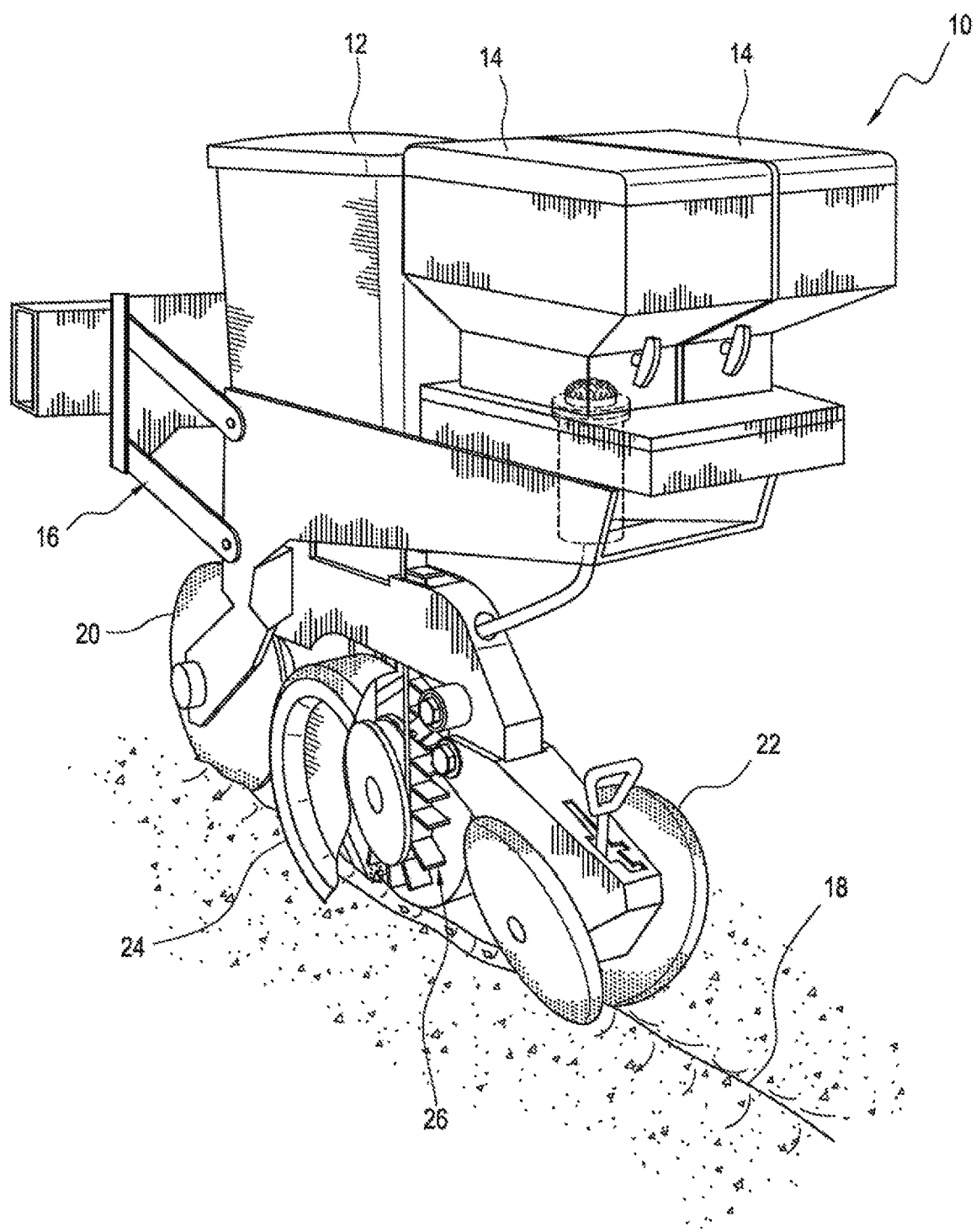
FIG. 1 is a perspective view of the system for electronically pulsing chemical with seed in accordance with one embodiment of the present invention.
Figure 2:
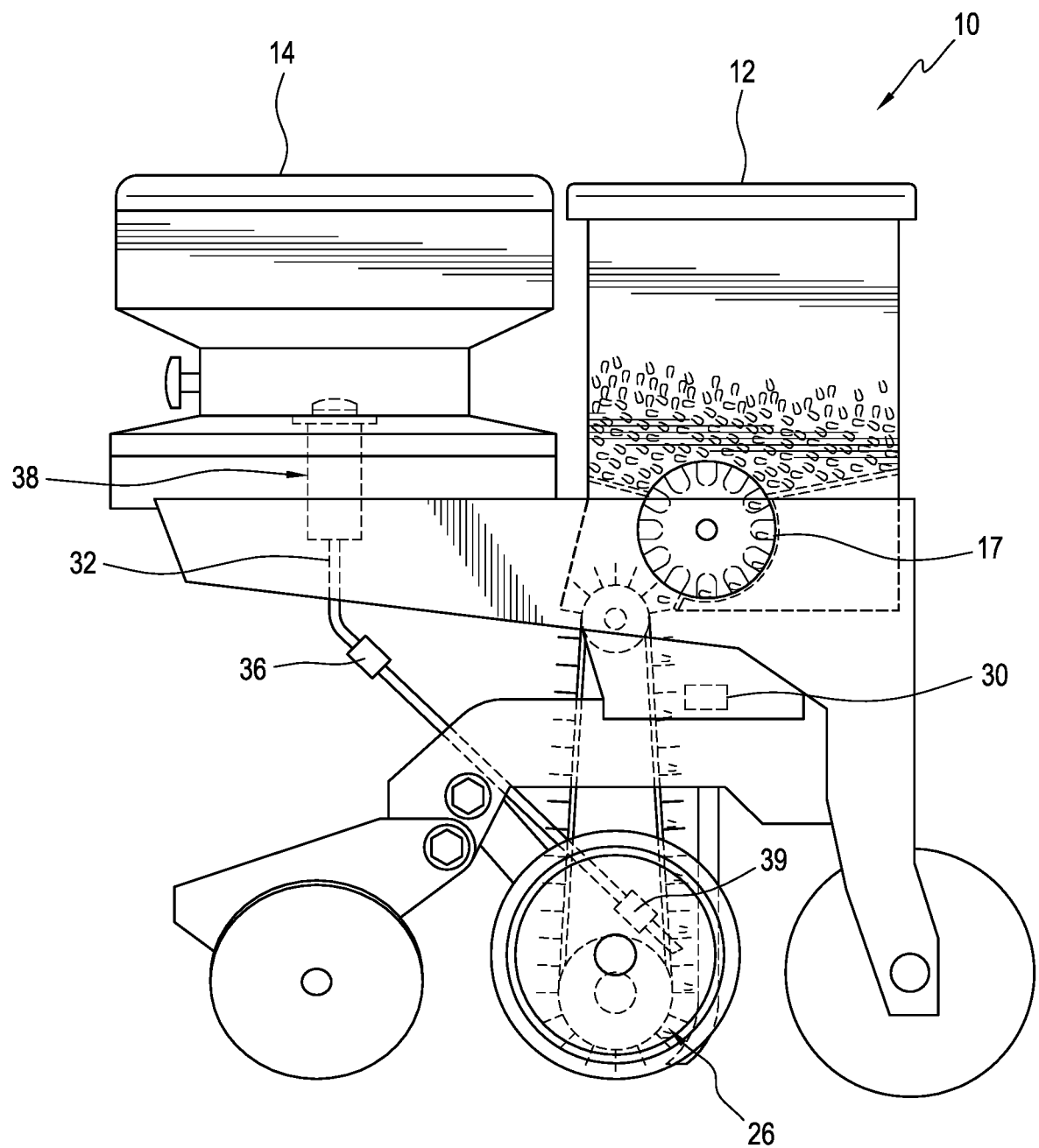
FIG. 2 is a side schematic view of the system for electronically pulsing chemical with seed in accordance with one embodiment of the present invention.

Referring now to the drawings and the characters of reference marked thereon, FIGS. 1 and 2 illustrate the system 10 for electronically pulsing chemical with seed in accordance with one embodiment of the present invention. The system 10 includes a seed compartment 12 and one or more agricultural product storage compartments 14 for holding, for example, insecticide or other pesticides. The system 10 for electronically pulsing agricultural product with seed may be disposed on top of seed planter row unit 16, and may be removable from the seed planter unit 16. As such, system 10 can be returned to the seed and insecticide distributor for refilling.

Planter unit (i.e. seed planter row unit) 16 may follow behind a seed trenching unit (not shown) or may include a seed trenching unit (not shown). The seed planter row unit 16 has a seed metering system 17. In either case, a seed furrow 18 is trenched in the soil. The planter unit includes a furrow opening wheel 20 to open the seed furrow 18 into which the seeds and agricultural product (e.g. chemical granules) are dispensed; and, closing wheels 22 that turn the soil to cover the seed furrow 18. A depth control wheel assembly 24, shown partially cutaway (also sometimes referred to as a "depth wheel assembly") controls the seed trench depth. Although FIGS. 1 and 2 show one system 10, it should be understood that typical planters include multiple systems, e.g., twenty-four (24) of such systems.

The system 10 includes a seed transport mechanism 26 affixed to the seed planter row unit 16, configured to dispense seed. The seed transport mechanism 26 serves as a seed conveyor, and may be, for example, a paddle belt assembly, brush belt assembly, or other seed conveyor assemblies, as discussed below in more detail.

A seed sensing device 30 (see, e.g., FIG. 2) is operably connected to the seed transport mechanism 26 and configured to sense a dispensation of the seed from the seed transport mechanism 26. The seed sensing device 30 may be, for example, a proximity sensor, coupled to the seed transport mechanism to detect the presence of a seed; it may typically be a light beam or infrared sensing device; or, microwave device).

Seed sensing device 30 may be disposed on the exterior of seed transport mechanism 26 as shown. Alternatively, seed sensing device 30 may be disposed within seed transport mechanism 26, or within in any location along the longitude or cross-section or elsewhere in system 10 where it may sense the presence of a seed that has been dispensed from the seed transport mechanism 26 for the purpose of timing a dispensation of chemical granules.

An agricultural product conduit (e.g. tube) 32 (see, e.g., FIG. 2) is configured to dispense agricultural products from an opening thereof into the seed transport mechanism 26 to provide dispensing of the agricultural products with the seed as the seed and agricultural product exit the seed transport mechanism. The agricultural product may be dry or liquid.

A control interface electronic system 36 is operably connected to an agricultural product metering system 38 and the agricultural product tube 32. The control interface electronic system 36 is configured to dispense a particular quantity of agricultural products with the seed in the seed transport mechanism 26. The chemical metering system may be, for example, a SmartBox® System marketed by AMVAC Chemical Corporation, a division of American Vanguard Corporation. Or, other suitable metering systems may be used such as metering systems manufactured by Precision Planting LLC, Tremont, Ill.; or, for example, Kinze Manufacturing, Inc., Williamsburg, Iowa. The metering system may use a dry or liquid metering device, i.e. may be a pump.

An electrical pulsing valve 39 is operably coupled to the agricultural product tube 32 and the control interface electronic system 36, and disposed between the opening of the agricultural product tube 32 and the agricultural product metering system 38. The electrical pulsing valve 39 is configured to open to dispense agricultural products from the opening of the agricultural product tube 32 when the seed sensing device 30 senses the dispensation of the seed.

The electrical pulsing valve 39 may be, for example, a commercially available air flow control valve or a mechanical valve. The SmartBox® System currently utilizes an electrically controlled solenoid. The electrical pulsing valve 39 opens and closes as needed to apply agricultural product with seed.

It may be desirable for the electrical pulsing valve to be as close to the seed discharge opening as possible so the agricultural product pulses will not have time to lose their integrity and break down into a continuous stream.

The seed transport mechanism 26 is configured to provide a seed release speed at which the seed exits the seed transport mechanism proportional to the ground speed of the seed planter row unit to minimize seed tumbling thus optimizing accurate placement of seed at varying ground speeds of the seed planter row unit 16. Direct application of the agricultural product into the seed transport mechanism prior to exiting keeps the seed release speed consistent with the ground speed of the seed planter row unit.

Although the seed transport mechanism 26 has been illustrated with its use with a closed container the synchronized delivery of seed and agricultural product disclosed herein, where the seed and chemical are combined in the seed transport mechanism, is beneficial without regard to the type of container used to deliver the chemical. There is high value to the farmer when even very safe products from open-top container systems are dispensed via synchronized delivery with the seed.

Figure 3:
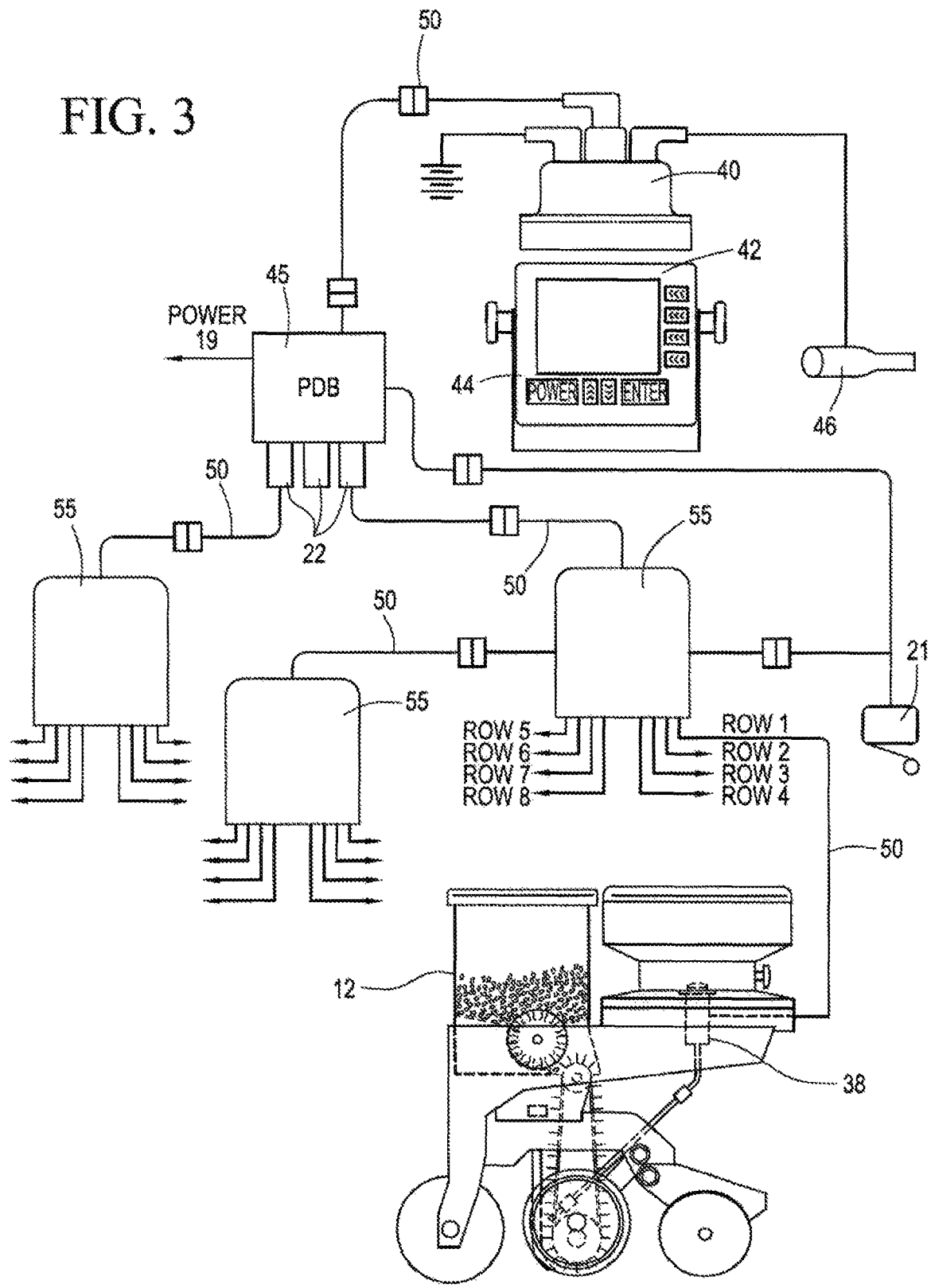
FIG. 3 is a schematic illustration of the distributed control system of the system for electronically pulsing chemical with seed integrated, with a main microcontroller unit having a display and keypad for operator interface.

Referring now to FIG. 3, a simplified diagram of the planter 16 incorporating a distributed control material dispensing system is illustrated. The dispensing system shown in FIG. 3 is shown by way of illustration and not limitation. Furthermore, the material dispensing system of the present invention may be used with other types of agricultural implements, but is primarily used with seed planting equipment. Although the Figures show a single row of planting equipment, planters include multiple rows, perhaps 48 or more.

Figure 4A:
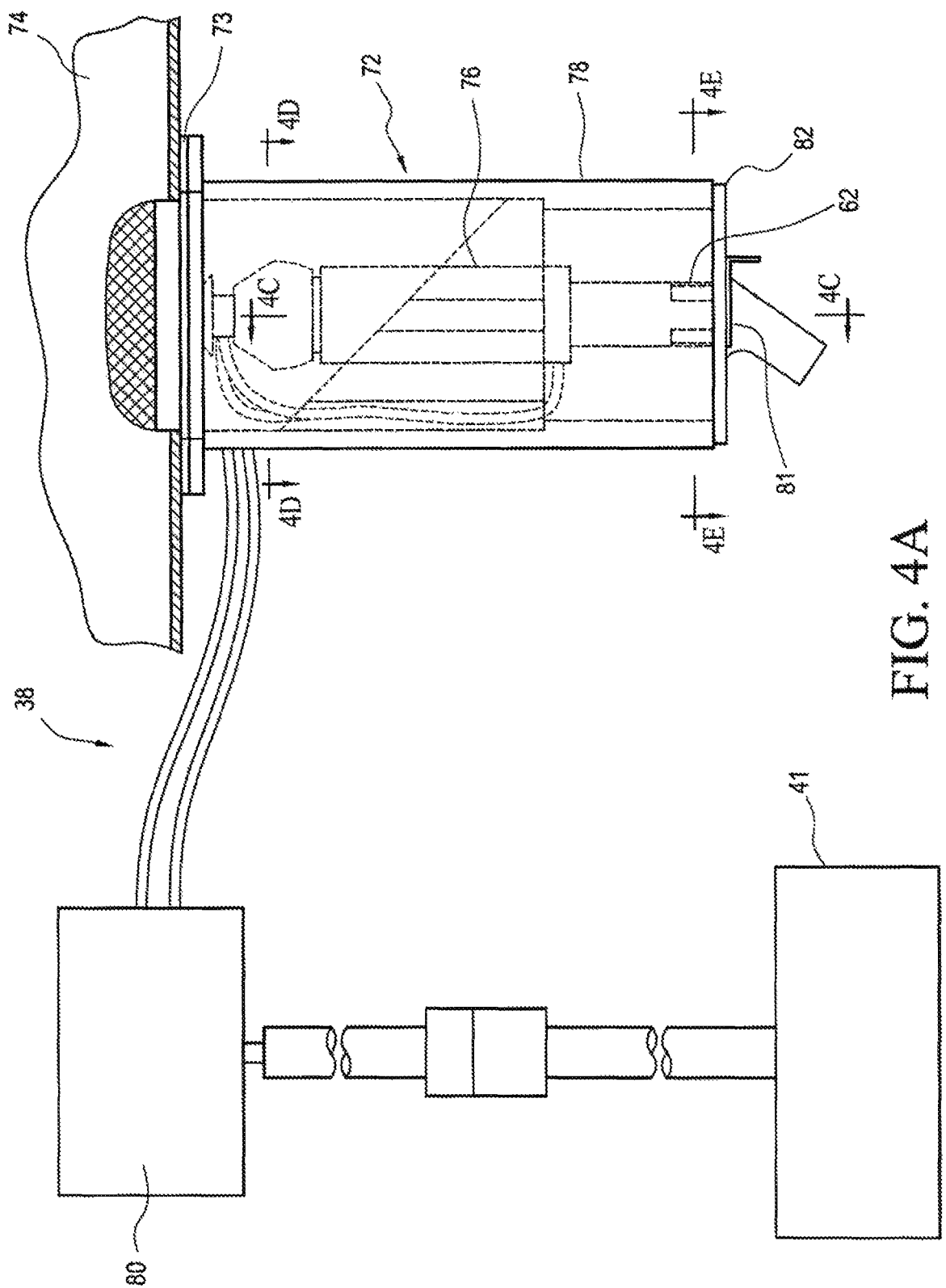
FIG. 4A Illustrates one embodiment of a metering system and memory unit of the system for electronically pulsing chemical with seed.

In the example shown, the distributed control system includes a main microcontroller 40, which communicates to a plurality of sub-controllers 41 (see FIG. 4A) associated with the metering system 38 that control the meter action. (As used herein the term sub-controller may alternatively be referred to as a secondary controller, slave controller, or row controller.) The sub-controllers 41 implement commands received from the main control unit 40 by applying electric power to the metering system 38. The agricultural product container 14 may contain a memory device for retaining information pertaining to the material in the container 14 and to a metering device of the metering system 38 (see also FIGS. 2 and 4A). This information is used by the main control unit (i.e. main microcontroller or master controller 40) and the sub-controllers 41 to properly dispense the product. The sub-controller 41 may be in communication with an RFID device that communicates with a memory device in the agricultural container 14. The sub-controller 41 may also be connected to a level sensor located in the base unit that is used to connect the metering device to the agricultural product container 14.

The material dispensing system shown in the figures is a distributed control system that employs the master microcontroller computer 40 located in the operator's cab or integrated into the onboard master display and control system of the tractor. The computer 40 may be a commercially available device such as an IPad® tablet or, other commercially available tablets, or other smart devices. As noted, typically, the material dispensing system is used in conjunction with a seed planter 16 which is attached to and pulled by a farmer's tractor (not shown). Each row of the seed planter 16 includes a seed hopper and seed planting mechanism 12 and one or more agricultural product containers (i.e. typically a product container) 14 and associated dispensing mechanism (i.e. meter system) 38. The agricultural products may be dry, granular products or liquid products. The agricultural products include, but are not limited to, insecticides, herbicides, fungicides, fertilizers and other agricultural products. They also may include growth hormones, growth promotion products, and other products for enhancing crop production. This master or main controller 40 distributes command and control information via a high speed serial communications link 50, via a power distribution box 45, to the sub-controllers 41 connected to individual meter systems 38. The high speed serial communication system may be wireless. Each row corresponds to one row in the field being planted. Each individual meter system 38 is controlled by its own slave or row controller (i.e. sub-controller) 41 (see FIG. 4A). The metering system 38 includes an electronic memory circuit 80 and a metering or dispensing device 72 (see FIG. 4A). The metering system 38 can be permanently attached to the base unit 74 or product container 14. The meter system 38 may be attached using a known tamper evident securing system. The row controller, i.e. sub-controller 41 is operatively connected with a material flow sensor 62 (see FIG. 4A) which is in communication with the row controller 41. The material flow sensor 62 detects the presence or absence of flow from the product container 14 (e.g. base unit 74).

In operation, the main control unit (i.e. master controller) 40 receives a desired dispensing rate from the operator via the display 42 and keypad 44. The main control unit 40 monitors the planter's 16 ground speed by the speed sensing device 46. Using the desired dispensing rate, the ground speed and basic dispensing characteristics for the metering device, command data for the row control unit (i.e. sub-controller 41) are prepared. In one example, a dispensing control for a solenoid type metering device uses a fixed rate for actuating the metering device, 0.5 seconds, and vary the on time (or duty cycle) of the metering device, 10% to 50%. The row control unit modifies the duty cycle specified by the main control unit 40 to account the actual metering device calibration data which were retrieved from the memory device 80. The row control unit continues to operate the metering device at the rate and duty cycle specified by the main control unit 40 until new commands are received from the main control unit 40. The main control unit 40 may calculate the quantity of material remaining in the product container.

The master controller 40 is connected to the power distribution box 45, which in turn, is connected to junction boxes 55 via high speed serial communications links 50. The row control unit may include the flow sensor 62 (FIG. 4A) as part of its electronic circuit. The flow sensor senses the flow of material from the container 14. The main control unit 40 can monitor the flow sensors 62 and generate visual and audible alarms as required. The flow sensor 62 may include an infra-red light source positioned across from an infra-red light detector. These two components may be mounted on a printed circuit board which is part of the row control unit 41. (A hole is made in the board between the light source and the light sensor.) Alternatively, the flow sensor 62 may be a separate unit operatively connected to the row control unit 41. The dispensed product is guided between the light sensor and the light source. The logic circuit associated with the flow sensor 62 monitors for the presence of flow by intermittent interruptions of the light reaching the light sensor. Proper flow will cause intermittent interruptions of the light. A non-interrupted light will signal no material flowing from the container 14. A completely interrupted light will indicate no flow of material through the tubing after the flow sensor 62.

Referring again to FIG. 4A, a side view of an agricultural product metering system is illustrated, designated generally as 38. The meter system 38 includes a metering device 72 and memory unit 80. A base plate 73 is fastened to the bottom of the base container 74 or product container 14. The electromechanical metering device 72 is attached to the base plate 73. The metering device 72 shown in this figure uses an electric solenoid 76. The solenoid 76 is contained within a meter housing 78. The solenoid 76 is energized by the row control unit to retract the solenoid plunger away from the material dispensing aperture (not shown), thereby allowing product to flow by gravity out of the container 74.

The solenoid 76 must be sealed from the product. Product entering the solenoid 76 can cause its premature failure. The solenoid 76 is sealed by a cover to prevent entry of product into the solenoid 76.

An outlet aperture is on the bottom of the meter system 38. In the embodiment illustrated a removable calibrated orifice element 81 is disposed within the outlet aperture. The flow sensor 62 is configured to sense a greater flow rate at the inlet aperture than at the outlet aperture. An adjustment mechanism is configured to adjust the flow rate of the meter. A removable calibration orifice plate holder 82 may be used.

Figure 4B:
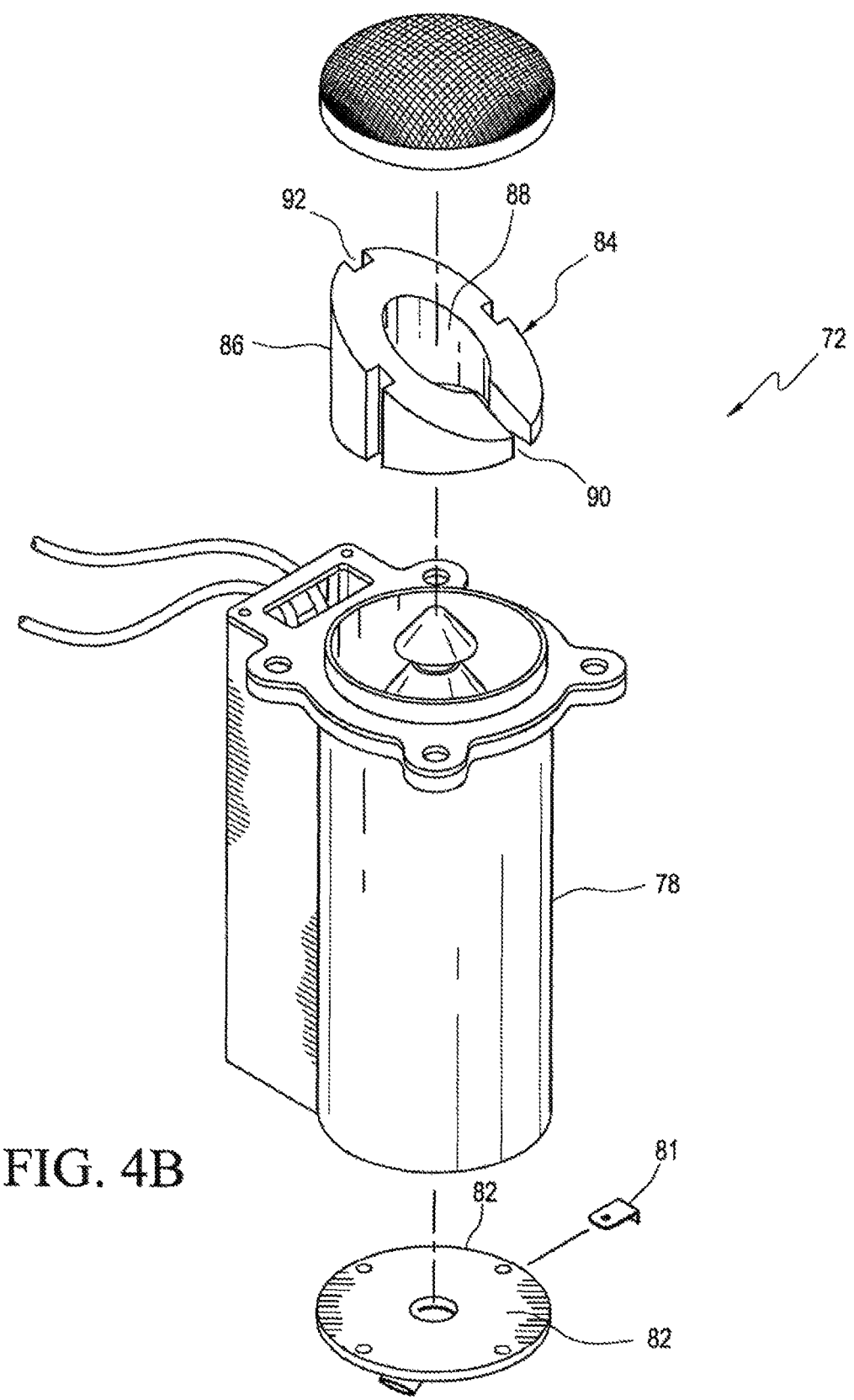
FIG. 4B is an exploded perspective view of an embodiment of a metering system using a solenoid and a single slope, wedge-type of in-meter diffuser.

Material needs to be delivered to the electrical pulsing valve 39 in a uniform stream to provide material so that the pulsing valve 39 accurately delivers the same amount per pulse. Therefore, the material is preferably diffused in a continuous stream before introduction to the electrical pulsing valve 39 and ultimately to the seed transport mechanism. This can be accomplished using some type of diffuser. As can be seen in FIG. 4B, the meter (or metering device) 72 may use a single slope, wedge-type in-meter diffuser 84. The in-meter diffuser 84 includes a main body 86 having a substantially circular cross-section, a sloped upper end and a lower end, and defining a longitudinal central axis thereof. The main body 86 includes a longitudinally disposed central opening 88 extending from the upper end to the lower end. The central opening 88 is configured to serve as a compartment for the solenoid 76 of the system for dispensing chemical granules. A primary exit opening 90 extends from the upper end to the lower end (for most of the material leaving under normal vertical operating conditions). A plurality of spaced extending cutaway portions 92 on an outer surface thereof define a plurality of secondary exit openings (in case the primary exit opening becomes plugged or operation on slopes, or going up and down hills).

Figure 4C:
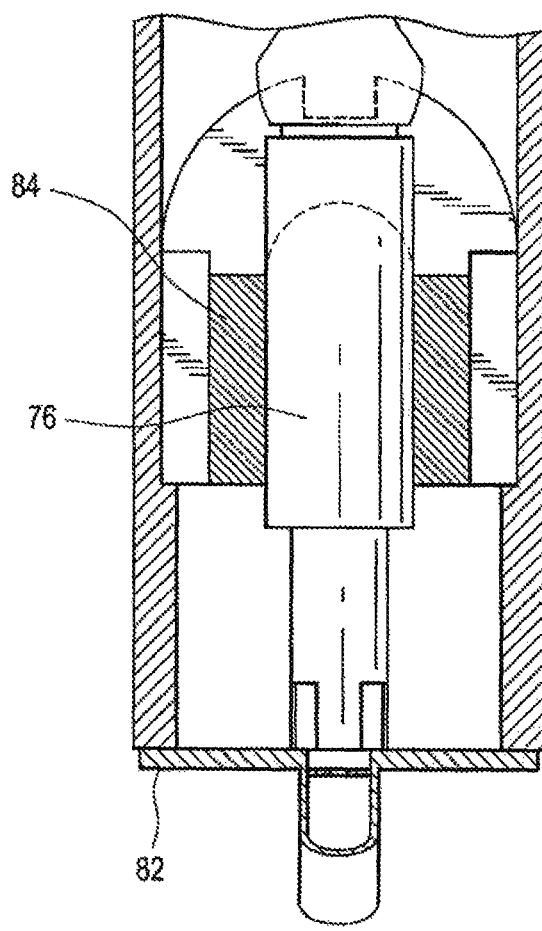
FIG. 4C is a longitudinal section, taken along lines 4C-4C of FIG. 4A.
Figure 4D:
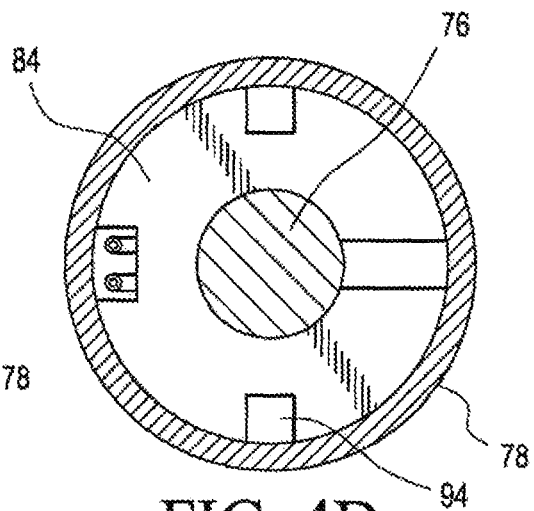
FIG. 4D is a section taken along lines 4D-4D of FIG. 4A.
Figure 4E:
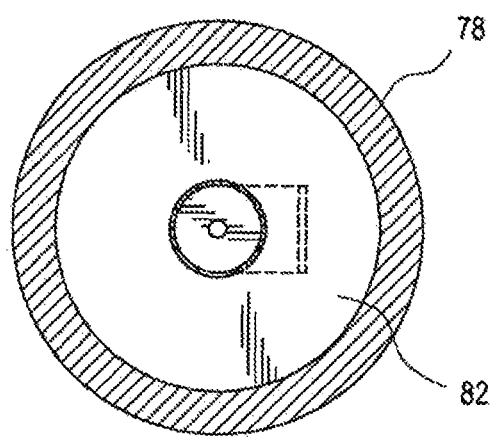
FIG. 4E is a section taken along lines 4E-4E of FIG. 4A.
Figure 4G:
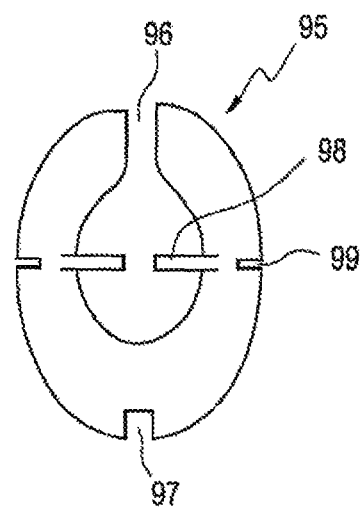
FIG. 4G shows another embodiment of the diffuser using a single plate.
Figure 4F:
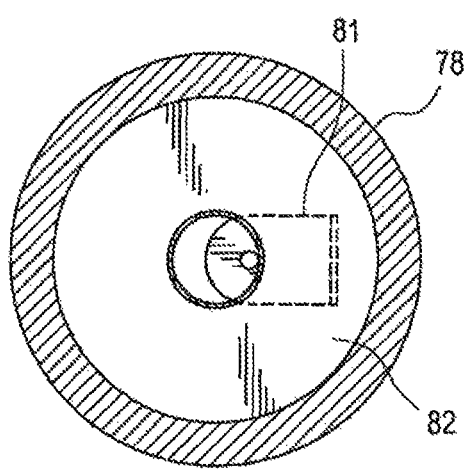
FIG. 4F shows the orifice plate partially opened.

FIG. 4C is a longitudinal section taken thru the diffuser 84 and solenoid and also showing a removable calibrated orifice element 81 and calibration orifice plate holder 82. The solenoid 76 is shown in full lines rather than in section. The diffuser 84 is in section and goes thru the two cutaway portions 94 which are shown on either side of the diffuser 84. FIG. 4D is a section looking down on the diffuser 84. The hatched circle in the middle is a simplified section of the solenoid 76. FIG. 4E is a section looking down on the removable calibrated orifice element 81 and calibration orifice plate holder 82. FIG. 4F is the same as FIG. 4E except with the orifice plate partially opened. Use of this removable calibrated orifice element 81 and calibration orifice plate holder 82 is not limited to a solenoid type metering device and may be used for other metering devices known in this field. Additionally, it may be used, for example, with the auger metering device described below.

Instead of being of a wedge-type the single slope in-meter diffuser may comprise a single plate. As shown in FIG. 4G a horseshoe shaped diffuser plate 95 is positioned to have a first, upper portion thereof proximate an upper end of the solenoid. The horseshoe shaped diffuser plate is positioned to be sloped relative to a longitudinal axis of the solenoid. The horseshoe shaped diffuser plate functions as a slide for some of the chemical granules being dispensed at the solenoid 76. A space 96 formed between two ends of the horseshoe shaped diffuser plate functions as an exit opening for the discharge of chemical granules. An overflow recess 97 is formed in the horseshoe shaped diffuser plate at the first, upper portion thereof. A pair of support tabs 98 extend from an inner surface of the horseshoe shaped diffuser plate.

A pair of side wire openings 99 are on an surface of the horseshoe shaped diffuser plate. The tabs are bent during use to support the solenoid.

Figure 5A:
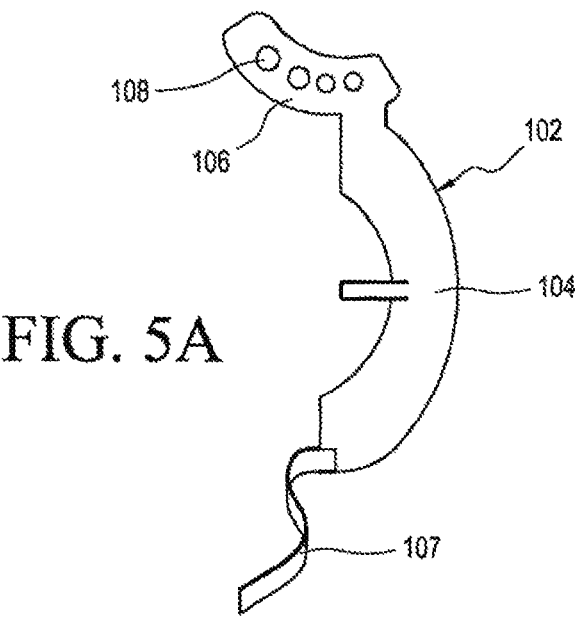
FIG. 5A is a view of one of the arcuate main diffuser plates used in a double slope in-meter diffuser assembly.
Figure 5B:
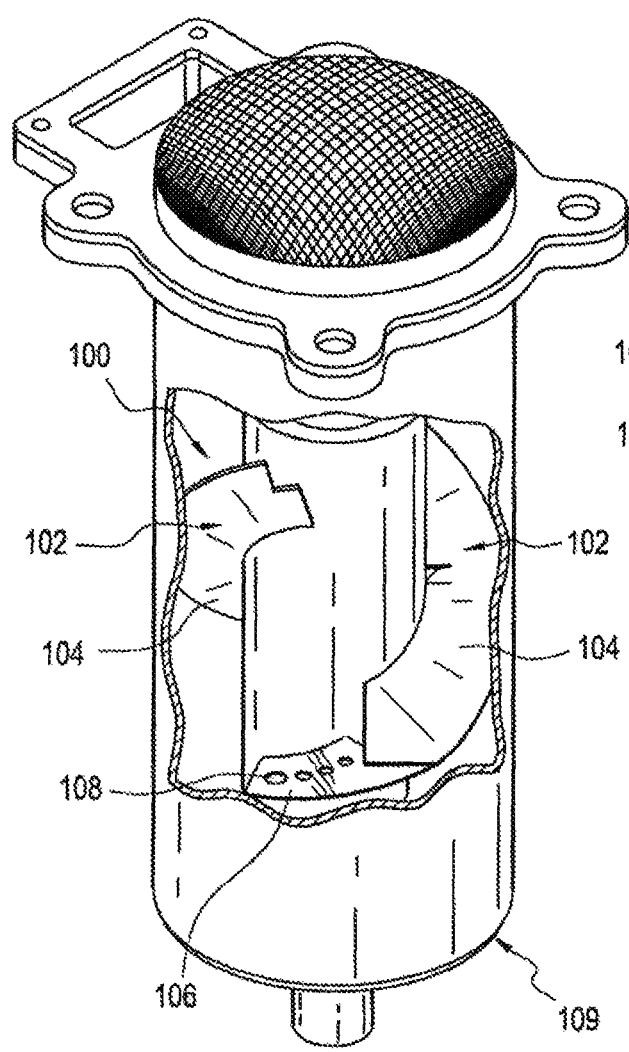
FIG. 5B is a perspective view, partially in cross section, of a double slope in-meter diffuser assembly installed in a metering system.
Figure 5C:
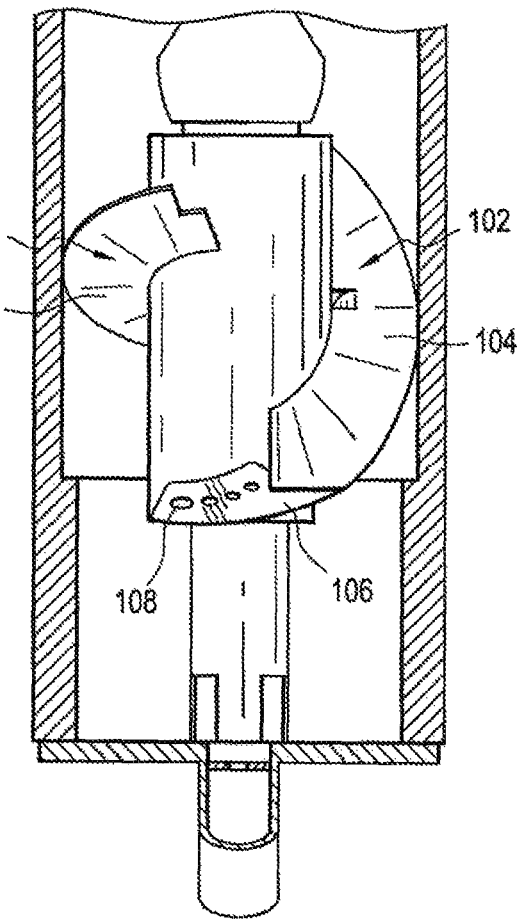
FIG. 5C shows the metering system of FIG. 5B partially in cross section.

Referring now to FIGS. 5A-5C, an embodiment of a meter is shown that includes a double slope in-meter diffuser assembly 100, i.e. one with a modified double helix design. The double slope in-meter diffuser assembly 100 includes a pair of diffuser elements 102, each diffuser element 102 comprising an arcuate main diffuser plate 104 positioned to have a first end thereof proximate an upper end of the solenoid. The arcuate main diffuser plate is positioned to be sloped relative to a longitudinal axis of the solenoid. The arcuate main diffuser plate functions as a slide for some of the chemical granules being dispensed at the solenoid. An orifice plate 106 depends from a lower end of the arcuate main diffuser plate. The orifice plate has at least one discharge opening 108 for discharging chemical granules from the in-meter diffuser assembly 109. A somewhat flexible strip 107 extends from the upper end of the arcuate main diffuser plate 104 to bias the diffuser element 102 against the meter body.

Figure 6:
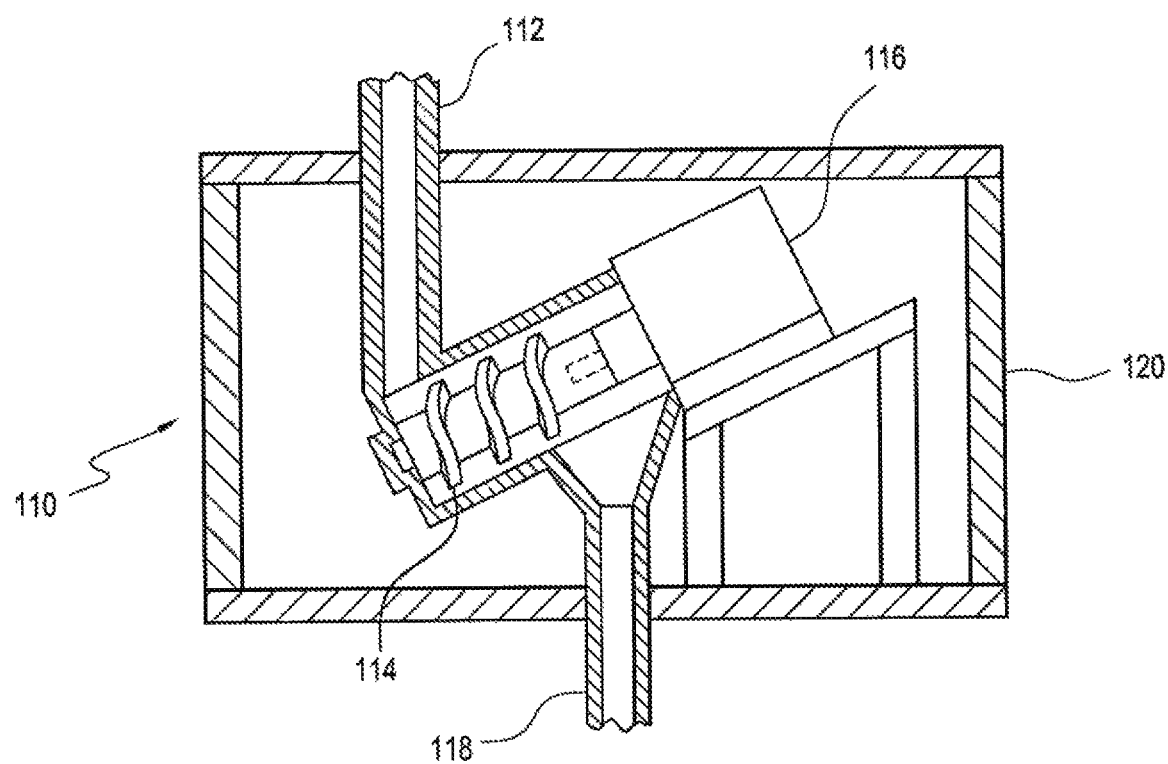
FIG. 6 is a schematic illustration of an inclined auger metering system.

Although the present invention has been discussed relative to solenoid type agricultural product metering systems other types of metering systems may be utilized in accordance with the principles of the present invention. For example, the agricultural product metering system may include an auger meter. FIG. 6 illustrates an inclined auger metering system 110 including an inlet 112 for agricultural product, an inclined auger 114, a motor 116, and an outlet 118, contained within housing 120. An inclined auger is preferably used over vertical or horizontal augers. It provides more even feeding. If a vertical auger is used for metering several issues need to be overcome. One is that when a vertical auger stops the material slides or leaks back down the auger flighting and then there is a delay in the material flow when it is started back up. Also to get flow at normal speeds the product needs to be pushed to the sides of the auger tube by centripetal force to provide the friction needed for the flighting to move the material. This requires more power and is non-linear in flow rate as the speed of the auger increases resulting in adjustment of flow accuracy issues.

Use of a horizontal auger is generally preferably over a vertical auger. However, an inclined auger is most preferred because in non-fixed positions, i.e. when used in field applications, the variations of flow with a horizontal auger are greater than with an inclined auger. The inclined auger is typically about 15 to 30 degrees. When the auger is tilted in a downhill position there is a greater variation in flow than if the auger is always in an above level flow. Also, with an inclined auger more product at the auger end for a quicker flow after the auger has started from an off position and material is kept from leaking past the end flighting during the off time.

The agricultural product metering system may utilize a liquid pump if liquid agricultural products are utilized. A variety of suitable liquid pumps used in standard agricultural practices may be used such as centrifugal pumps, piston pumps, and diaphragm pumps, for application of agricultural fluids.

Referring now to FIG. 7A, the lower portion of the seed transport mechanism 26 illustrated in FIG. 2, comprising a paddle belt assembly 130 is illustrated. With a paddle belt assembly 130, seed is introduced onto paddles 132. The agricultural product is introduced into the paddle belt assembly 130 by conduit 131 (typically a tube) to provide dispensing of the agricultural product with the seed as the seed and agricultural product exit the paddle belt assembly 130. The paddle belt assembly 130 may be driven by a pulley 134. A housing 136 of the paddle belt assembly 130 cooperates with the paddles 132 to release the seed and agricultural product from the paddle belt assembly 130 at a release speed proportional to the ground speed of the seed planter row unit to minimize seed tumbling to optimize accurate placement of seed at varying ground speeds of the seed planter row unit.

U.S. Pat. Publication US 2015/0195988 entitled SEED DELIVERY APPARATUS, SYSTEMS, AND METHODS discloses seed delivery apparatus and methods in which a seed conveyor delivers seed from a metering device to a furrow in a controlled manner to maintain seed placement accuracy within the furrow. U.S. Pat. Publication US 2015/0195988 is incorporated by reference herein in its entirety.

FIG. 7B shows another embodiment of the seed transport mechanism in which a brush belt assembly 138 is utilized with the agricultural product conduit 139 to provide seed and agricultural product at a release speed proportional to the ground speed of the seed planter row unit to minimize seed tumbling to optimize accurate placement of seed at varying ground speeds of the seed planter row unit. In the embodiment illustrated a pulley 140 is used with a brush belt 142.

Figure 7C:
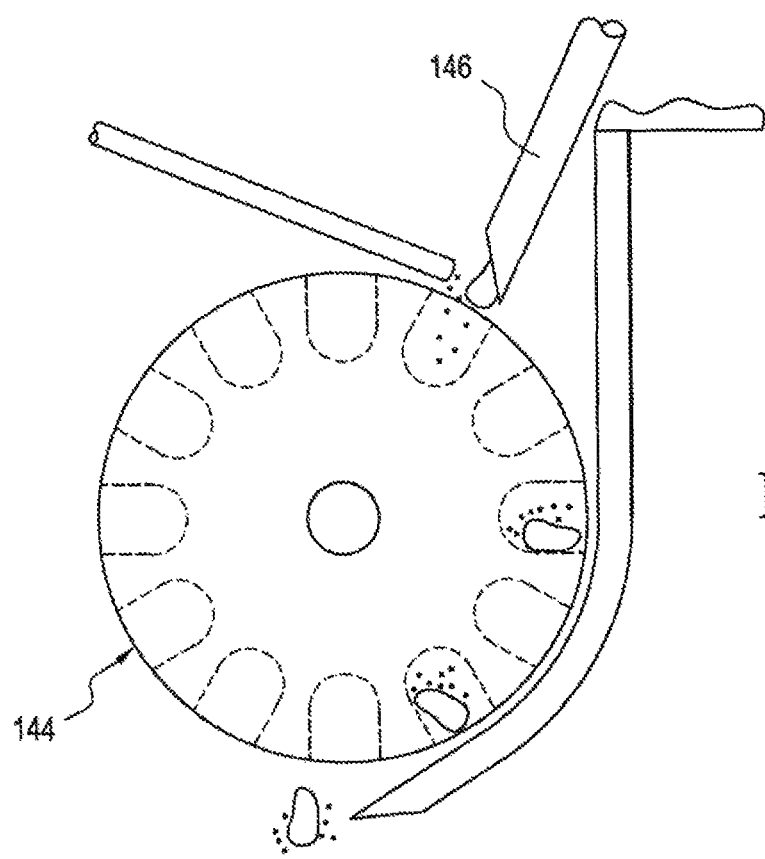
FIG. 7C is a schematic illustration of a seed transport mechanism using a disc/seed pocket assembly.

FIG. 7C shows another embodiment of the seed transport mechanism in which a disc/seed pocket assembly 144 is utilized with the agricultural product conduit 146 to provide seed and agricultural product at a release speed proportional to the ground speed of the seed planter row unit to minimize seed tumbling to optimize accurate placement of seed at varying ground speeds of the seed planter row unit.

Figure 7D:
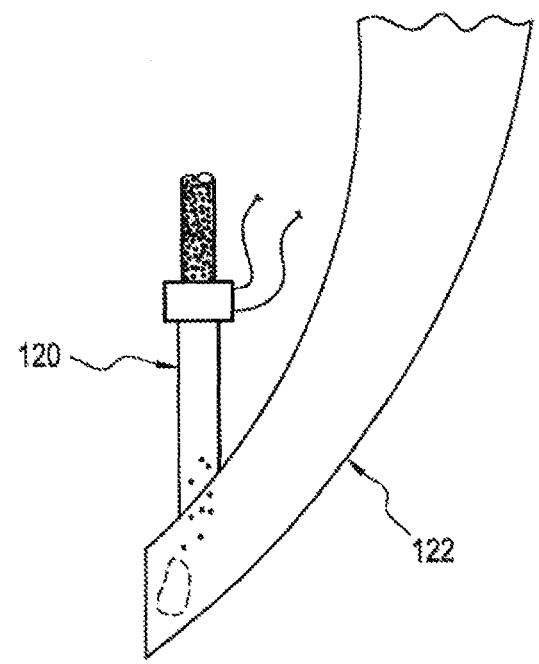
FIG. 7D shows another embodiment in which an agricultural product tube assembly provides agricultural product through an opening in a seed tube assembly.

FIG. 7D shows another embodiment in which an agricultural product tube assembly 120 provides agricultural product through an opening in a seed tube assembly 122.

Using a seed transport mechanism affixed to a seed planter row unit is beneficially adapted to operate with a seed planter row unit operating at a high speed. High speed, as that term is used herein, is between about 7 and about 16 mph. However, this invention can also be used at lower speeds.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), General Purpose Processors (GPPs), Microcontroller Units (MCUs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure.

In addition, those skilled in the art will appreciate that the mechanisms of some of the subject matter described herein may be capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communication link, a wireless communication link (e.g., transmitter, receiver, transmission logic, reception logic, etc.).

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

As mentioned above, other embodiments and configurations may be devised without departing from the spirit of the invention and the scope of the appended claims.

The invention claimed is:

1. A system for electronically pulsing agricultural product with seed, comprising:
   a) a seed transport mechanism affixed to a seed planter row unit having a seed metering system, operating at a high speed configured to dispense seed, said seed transport mechanism including a conduit for introducing agricultural product with seed, wherein said agricultural product is configured to be introduced with said seed after output from the seed metering system;
   b) a seed sensing device operably connected to the seed transport mechanism and configured to sense a dispensation of the seed from the seed transport mechanism;
   c) said agricultural product conduit configured to dispense agricultural products into the seed transport mechanism to provide dispensing of the agricultural products with the seed as the seed and agricultural product exit the seed transport mechanism, said agricultural products comprising chemical granules;
   d) a control interface electronic system operably connected to an agricultural product metering system and the agricultural product conduit, the control interface electronic system being configured to dispense a particular quantity of agricultural product with the seed in the seed transport mechanism; and,
   e) an electrical pulsing valve operably coupled to the agricultural product conduit and the control interface electronic system, being configured to open to dispense chemical granule agricultural products from the agricultural product conduit when the seed sensing device senses the dispensation of the seed, and,
   wherein the seed transport mechanism is configured to provide a seed release speed at which the seed and agricultural product exit the seed transport mechanism, the seed release speed being varied in a manner proportional to the variation in the ground speed of the seed planter row unit to minimize seed tumbling to optimize accurate placement of seed and chemical granule agricultural product at varying ground speeds of the seed planter row unit.

2. The system claim 1 wherein said seed transport mechanism and said agricultural product tube are in an integrated assembly for placement of the chemical granules with the seed.

3. The system of claim 1 wherein said seed transport mechanism comprises a paddle belt assembly.

4. The system of claim 1 wherein said seed transport mechanism comprises a brush belt assembly.

5. The system of claim 1 wherein said seed transport mechanism comprises a disc/seed pocket assembly.

6. The system of claim 1 wherein said seed transport mechanism comprises a seed tube assembly.

7. The system of claim 1 further comprising said agricultural product metering system, wherein said agricultural product metering system includes an in-meter diffuser.

8. The system of claim 1 further comprising said agricultural product metering system, wherein said agricultural product metering system includes a single slope in-meter diffuser.

9. The system of claim 1 further comprising said agricultural product metering system, wherein said agricultural product metering system includes a double slope in-meter diffuser.

10. The system of claim 1 further comprising said agricultural product metering system, wherein said agricultural product metering system includes an inclined auger.

11. The system of claim 1 wherein said seed transport mechanism affixed to a seed planter row unit is configured to operate with a seed planter row unit operating at a high speed defined as between about 7 and about 16 mph.

12. A method for electronically pulsing agricultural product with seed, comprising:
   a) dispensing seed utilizing a seed transport mechanism affixed to a seed planter row unit having a seed metering system, operating at a high speed, configured to dispense seed, said seed transport mechanism including a conduit for introducing agricultural product with seed, wherein said agricultural product is configured to be introduced with said seed after output from the seed metering system;
   b) sensing a dispensation of the seed from the seed transport mechanism utilizing a seed sensing device operably connected to the seed transport mechanism;

c) dispensing agricultural products with the seed as the seed and agricultural product exit the seed transport mechanism by utilizing said agricultural product conduit for dispensing agricultural products into the seed transport mechanism prior to exiting the seed transport mechanism, said agricultural products comprising chemical granules;

d) dispensing a particular quantity of agricultural product with the seed in the seed transport mechanism utilizing a control interface electronic system operably connected to an agricultural product metering system and the agricultural product conduit;

e) dispensing chemical granule agricultural products from the agricultural product conduit when the seed sensing device senses the dispensation of the seed utilizing an electrical pulsing valve operably coupled to the agricultural product conduit and the control interface electronic system, wherein the seed transport mechanism is configured to provide a seed release speed at which the seed and agricultural product exit the seed transport mechanism, the seed release speed being varied in a manner proportional to the variation in the ground speed of the seed planter row unit to minimize seed tumbling to optimize accurate placement of seed and chemical granule agricultural product at varying ground speeds of the seed planter row unit.

13. The method of claim 12 wherein said seed transport mechanism and said agricultural product tube are in an integrated assembly for accurate placement of the chemical granules with the seed.

14. The method of claim 12 wherein said seed transport mechanism comprises a paddle belt assembly.

15. The method of claim 12 wherein said seed transport mechanism comprises a brush belt assembly.

* * * * *